(12) United States Patent
Clucas et al.

(10) Patent No.: US 11,653,007 B2
(45) Date of Patent: May 16, 2023

(54) LOW COMPLEXITY ENHANCEMENT VIDEO CODING

(71) Applicant: V-NOVA INTERNATIONAL LIMITED, London (GB)

(72) Inventors: Richard Clucas, London (GB); Lorenzo Ciccarelli, London (GB); Sam Littlewood, London (GB)

(73) Assignee: V-NOVA INTERNATIONAL LIMITED

( * ) Notice: Subject to any disclaimer, the term of this patent is extended or adjusted under 35 U.S.C. 154(b) by 172 days.

(21) Appl. No.: 17/260,335

(22) PCT Filed: Jul. 15, 2019

(86) PCT No.: PCT/GB2019/051974
§ 371 (c)(1),
(2) Date: Jan. 14, 2021

(87) PCT Pub. No.: WO2020/016562
PCT Pub. Date: Jan. 23, 2020

(65) Prior Publication Data
US 2021/0297681 A1    Sep. 23, 2021

(30) Foreign Application Priority Data

Jul. 15, 2018  (GB) ..................................... 1811594
Jul. 16, 2018  (GB) ..................................... 1811651
(Continued)

(51) Int. Cl.
*H04N 19/18* (2014.01)
*H04N 19/169* (2014.01)
(Continued)

(52) U.S. Cl.
CPC ......... *H04N 19/188* (2014.11); *H04N 19/177* (2014.11); *H04N 19/33* (2014.11); *H04N 19/70* (2014.11)

(58) Field of Classification Search
CPC ................................................... H04N 19/188
(Continued)

(56) References Cited

U.S. PATENT DOCUMENTS

| 2008/0225116 | A1  | 9/2008  | Kang et al. |
| 2011/0228855 | A1  | 9/2011  | Gao et al. |
| 2017/0295382 | A1* | 10/2017 | Su .......................... H04N 19/31 |

FOREIGN PATENT DOCUMENTS

WO    2007-115129    10/2007

OTHER PUBLICATIONS

International Search Report and Written Opinion for PCT/GB2019/051974 dated Sep. 26, 2019.
(Continued)

*Primary Examiner* — Yulin Sun
(74) *Attorney, Agent, or Firm* — Workman Nydegger

(57) ABSTRACT

According to an aspect of the invention there may be provided a method of decoding a bitstream, the method comprising: receiving a Supplemental Enhancement Information (SEI) message; parsing the SEI message to obtain an encoded bitstream, said encoded bitstream containing encoded information which is associated with information of an original signal; and, decoding said encoded bitstream to obtain decoded information which is used to reconstruct the original signal. A method of decoding is also provided as well as apparatuses and a computer readable medium.

14 Claims, 8 Drawing Sheets

(30) Foreign Application Priority Data

| Jul. 20, 2018 | (GB) | ........................................ | 1811933 |
| Mar. 20, 2019 | (GB) | ........................................ | 1903844 |
| Mar. 23, 2019 | (GB) | ........................................ | 1904014 |
| Mar. 29, 2019 | (GB) | ........................................ | 1904492 |
| Apr. 15, 2019 | (GB) | ........................................ | 1905325 |
| Jul. 11, 2019 | (GB) | ........................................ | 1909997 |

(51) Int. Cl.
      *H04N 19/177*    (2014.01)
      *H04N 19/33*     (2014.01)
      *H04N 19/70*     (2014.01)

(58) Field of Classification Search
      USPC .................................................. 375/240.26
      See application file for complete search history.

(56) References Cited

OTHER PUBLICATIONS

Wang et al., "Scalability Information SEI for SVC", 15. JVT Meeting; 72. MPEG Meeting; Apr. 16, 2005-Apr. 22, 2005; Busan, KR; (Joint Video Team of ISO/IEC JTC1/SC29/WG11 and ITU-T SG.16), No. JVT-O012, Apr. 14, 2005, XP030005960.

* cited by examiner

LOW COMPLEXITY ENHANCEMENT VIDEO CODING

The present application is a 371 US Nationalization of international patent application no. PCT/GB2019/051974, filed Jul. 15, 2019, which claims priority to the following United Kingdom patent application no(s):
1811594.9, filed Jul. 15, 2018;
1811651.7, filed Jul. 16, 2018;
1811933.9, filed Jul. 20, 2018;
1903844.7, filed Mar. 20, 2019;
1904014.6, filed Mar. 23, 2019;
1904492.4, filed Mar. 29, 2019;
1905325.5, filed Apr. 15, 2019; and
1909997.7, filed Jul. 11, 2019.
The entire disclosures of the aforementioned applications are incorporated herein by reference in their entireties.

BACKGROUND

A hybrid backward-compatible coding technology has been previously proposed, for example in WO 2014/170819 and WO 2018/046940, the contents of which are incorporated herein by reference.

The coding technology is a flexible, adaptable, highly efficient and computationally inexpensive coding format which combines a video coding format, a base codec, (e.g. AVC, HEVC, or any other present or future codec) with an enhancement level of coded data, encoded using a different technique.

The technology uses a down-sampled source signal encoded using a base codec to form a base stream. An enhancement stream is formed of an encoded set of residuals which correct or enhance the base stream for example by increasing resolution or by increasing frame rate. There may be multiple levels of enhancement data in a hierarchical structure. It is worth noting that typically the base stream is expected to be decodable by a hardware decoder while the enhancement stream is expected to be suitable for software processing implementation with suitable power consumption.

Methods and systems for efficiently transmitting and storing the base encoded information and enhancement encoded information are needed. In particular, it is important that the base encoded information and enhancement encoded information can be easily associated with one another and that decoding the data is optimised. Legacy hardware decoders and software decoders need to be able to process the base and enhancement streams separately to facilitate the advantages of the new coding technology. The streams are preferably transmitted in a single format.

SUMMARY OF THE INVENTION

According to aspects of the invention there is provided a method of encapsulating and/or embedding an enhancement stream into an elementary stream. The method may further comprise synchronising an enhancement stream and a base stream using a Network Abstraction Layer unit.

According to an aspect of the invention there may be provided a method of decoding a bitstream, the method comprising: receiving a Supplemental Enhancement Information (SEI) message; parsing the SEI message to obtain an encoded bitstream, said encoded bitstream containing encoded information which is associated with information of an original signal; and, decoding said encoded bitstream to obtain decoded information which is used to reconstruct the original signal.

By encapsulating encoded information associated with the original signal into an SEI message, multiple levels of quality may be transmitted using the base format without modification required of a base format. The two levels of quality can be synchronised, that is, the two levels of quality can be linked so that they can be combined. Where the signal is a video, the frames of the levels of quality can be synchronised so that residuals of the higher level of quality can be correctly combined with the right frame of the lower level. Legacy hardware decoders can ignore the messages and still decode the format while modified decoders are able to process the SEI message according to a known configuration and process.

Here associated with information of an original signal refers to any information that is related to an original signal. In examples, the encoded information may be residuals which combine with a respective part of the original signal. Similarly, the encoded information may correspond to a portion of the original signal and in this way may be associated. In general, associated with is not restricted to particular examples. It will be understood that the encoded information may be related to the original signal in some way. Nevertheless, once decoded, the information can be used to reconstruct the original signal. In preferred embodiments, the decoded information can be combined with other decoded information to reconstruct the signal.

The SEI message may be received in a first Network Abstraction Layer, NAL, unit. Thus, the NAL unit may be used to synchronise the encoded information with the original signal.

The encoded information may correspond to encoded residual values associated with the original signal. The original signal may be encoded in a hierarchical manner using at least two layers of encoding, and wherein one layer encodes residual values obtained by difference between a version of the original signal and a reconstructed version of the original signal.

The version of the original signal may be the original signal and the reconstructed version is at least in part formed from a decoded version of the signal encoded at a different layer of encoding. Alternatively, the version of the original signal may be a down-sampled version of the original signal and the reconstructed version is at least in part formed from a decoded version of the signal encoded at a different layer of encoding.

According to a further aspect, there may be provided a method of decoding a bitstream, the method comprising: receiving a first Network Abstraction Layer, NAL, unit; parsing the first NAL unit to obtain an encoded bitstream, said encoded bitstream containing encoded information which is associated with information of an original signal; and, decoding said encoded bitstream to obtain decoded information which is used to reconstruct the original signal.

Incorporating an enhancement stream into a building block of an elementary stream provides efficient transmission of the enhancement information and allows optimisation of decoding and synchronising of the streams.

In one embodiment the first NAL unit comprises a Supplemental Enhancement Information (SEI) payload. Preferably the payload may be a user_data_unregistered_type of a base coding standard.

The first encoded bitstream may be contained in a payload of the first NAL unit.

The first NAL unit may be a type of NAL unit reserved or unspecified according to a base coding standard such that the first NAL unit would be ignored by a decoder according to the base coding standard. In this way legacy decoders can ignore the enhancement stream and still process a base stream. The enhancement stream can be configured without significant limitation as the NAL unit can be configured in any way as it will be ignored by non-compliant decoders. Preferably, the NAL unit may be a '0' type according to a base decoding standard.

In one embodiment the method may comprise retrieving a reference index from the first NAL unit referencing a frame of the original signal. The reference index allows for associating the contents of a first NAL unit with a frame of the original signal so that enhancement can be provided to a correct frame.

The method may further comprise: receiving a second NAL unit; parsing the second NAL unit according to a base video coding standard to obtain a base encoded bitstream which is associated with base encoded information encoded using the base coding standard; decoding said base encoded bitstream to obtain the base decoded information; and, combining the base decoded information with the decoded information to reconstruct a signal.

Preferably the first and second NAL units are received in an Access Unit of an elementary stream according to a predefined format.

More preferably the Access Unit represents a frame of the original signal and the original signal is a video.

Further, the method may comprise retrieving a plurality of first NAL units from an Access Unit of an elementary stream, wherein each first NAL unit comprises encoded information representing a different level of enhancement such that information from each first NAL unit can be combined with information from the second NAL unit of the Access Unit to reconstruct an original signal.

The decoded information and the base decoded information may correspond to different layers of encoding of a signal.

The method may further comprise retrieving configuration metadata from the payload.

The method may further comprise retrieving configuration data in a header of the first NAL unit.

The method may further comprise retrieving a plurality of NAL units organised into a group of pictures; retrieving first configuration metadata signalled for each group of pictures; and, retrieving second configuration metadata signalled with each NAL unit. The group of pictures may be determined by the bitstream and set by a base decoding operation. The first NAL units may be organised in a group of pictures corresponding to a frame to which enhancement is to be provided to reconstruct the original signal. In other words, where a base coding operation collects frames, and hence NAL units into a group of pictures, the first NAL units may be collected into a similar group of pictures according to the respective or corresponding frame to which enhancement is to be applied.

The method may further comprise not retrieving configuration metadata for an initial NAL unit for each group of pictures where configuration metadata is sent for each group of pictures.

The method may further comprise retrieving third configuration metadata signalled for each bitstream.

The method may further comprise: retrieving a plurality of first NAL units in a defined order; retrieving a plurality of second NAL units in a defined order; combining the base decoded information with the decoded information; and, re-ordering the combination to reconstruct a signal.

According to a further aspect there may be provided a method of encoding a bitstream, the method comprising: encoding information which is used to reconstruct an original signal into an encoded bitstream, the encoded information associated with information of the original signal; encapsulating the encoded bitstream into a Supplemental Enhancement Information (SEI) message; and, transmitting the SEI message. The SEI message may be transmitted in a first Network Abstraction Layer, NAL, unit. The encoded information may correspond to residual values associated with the original signal. The method may comprise encoding the original signal in a hierarchical manner using at least two layers of encoding, wherein one layer encodes residual values obtained by difference between a version of the original signal and a reconstructed version of the original signal. The version of the original signal may be the original signal and the reconstructed version is at least in part formed from a decoded version of the signal encoded at a different layer of encoding. The version of the original signal may be a down-sampled version of the original signal and the reconstructed version is at least in part formed from a decoded version of the signal encoded at a different layer of encoding. By used to reconstruct an original signal, we mean that the encoded information may for example be a set of encoded residuals that combine to reconstruct an original signal during the encoding process. By used to reconstruct an original signal, we mean any suitable encoded information that can be combined with other encoded information to reconstruct the original signal.

According to a further aspect there may be provided a method of encoding a bitstream, the method comprising: encoding information which is used to reconstruct an original signal into an encoded bitstream, the encoded information associated with information of the original signal; encapsulating the encoded bitstream into a first Network Abstraction Layer, NAL, unit; and, transmitting the first Network Abstraction Layer, NAL, unit.

The encoded bitstream may be encapsulated in a Supplemental Enhancement Information (SEI) payload of the first NAL unit. The payload may be a user_data_ unregistered_type of a base coding standard.

The first encoded bitstream may be encapsulated in a payload of the first NAL unit.

The first NAL unit may be a type of NAL unit reserved or unspecified according to a base coding standard such that the first NAL unit would be ignored by a decoder according to the base coding standard.

The method may further comprise inserting a reference index into the first NAL unit referencing a frame of the original signal.

The method may further comprise: encoding a version of the original signal using a base coding standard into base encoded bitstream; encapsulating the base encoded bitstream into a second NAL unit; and, transmitting the second NAL unit. The first and second NAL units may be transmitted in an Access Unit of an elementary stream according to a predefined format. The Access Unit may represent a frame of the original signal and the original signal may be a video. The encoded bitstream and the base encoded bitstream may correspond to different layers of encoding of a signal.

The method may further comprise inserting configuration metadata into the payload. The method may further comprise inserting configuration data into a header of the first NAL unit. The method may further comprise: transmitting a plurality of NAL units organised into a group of pictures; transmitting first configuration metadata signalled for each group of pictures; and, transmitting second configuration metadata signalled with each NAL unit. The method may further comprise not transmitting configuration metadata for an initial NAL unit for each group of pictures where configuration metadata is sent for each group of pictures. The method may further comprise transmitting third configuration metadata signalled for each bitstream.

According to a further aspect there may be provided an apparatus for encoding a data set into an encoded data set. The apparatus configured to encode an input video according to the above steps. The apparatus may comprise a processor configured to carry out the method of any of the above aspects.

According to a further aspect there may be provided an apparatus for decoding a data set into a reconstructed video from a data set. The apparatus configured to decode an output video according to the above steps. The apparatus may comprise a processor configured to carry out the method of any of the above aspects.

An encoder and decoder may also be provided.

According to further aspects of the invention there may be provided computer readable media which when executed by a processor cause the processor to perform any of the methods of the above aspects.

The SEI message, NAL unit, predefined format and/or base coding standard may be associated with AVC, HEVC, AV1, VP8, or VP9. The base stream and the enhancement stream may be de-multiplexed at the decoder for decoding by a hardware decoder and a software decoder.

DETAILED DESCRIPTION

Examples of systems and methods in accordance with the invention will now be described with reference to the accompanying drawings, in which:—

The present invention relates to methods. In particular, the present invention relates to methods for encoding and decoding signals. Processing data may include, but is not limited to, obtaining, deriving, outputting, receiving and reconstructing data.

This document describes a hybrid backward-compatible coding technology which resembles the structure depicted and described in "Call for Proposals for Low Complexity Video Coding Enhancements" ISO/IEC JTC1/SC29/WG11 N17944, Macao, C N, October 2018 and "Requirements for Low Complexity Video Coding Enhancements" ISO/IEC JTC1/SC29/WG11 N18098, Macao, C N, October 2018. Certain examples are commercialised under the name PERSEUS® Plus.

PERSEUS® Plus is a flexible, adaptable, highly efficient and computationally inexpensive coding format which combines a different video coding format, a base codec, (e.g. AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including Over-The-Top (OTT) transmission, live streaming, live Ultra High Definition (UHD) broadcast, and so on.

Although the decoded output of the base codec is not intended for viewing, it is a fully decoded video at a lower resolution, making the output compatible with existing decoders and, where considered suitable, also usable as a lower resolution output.

Figure 1:
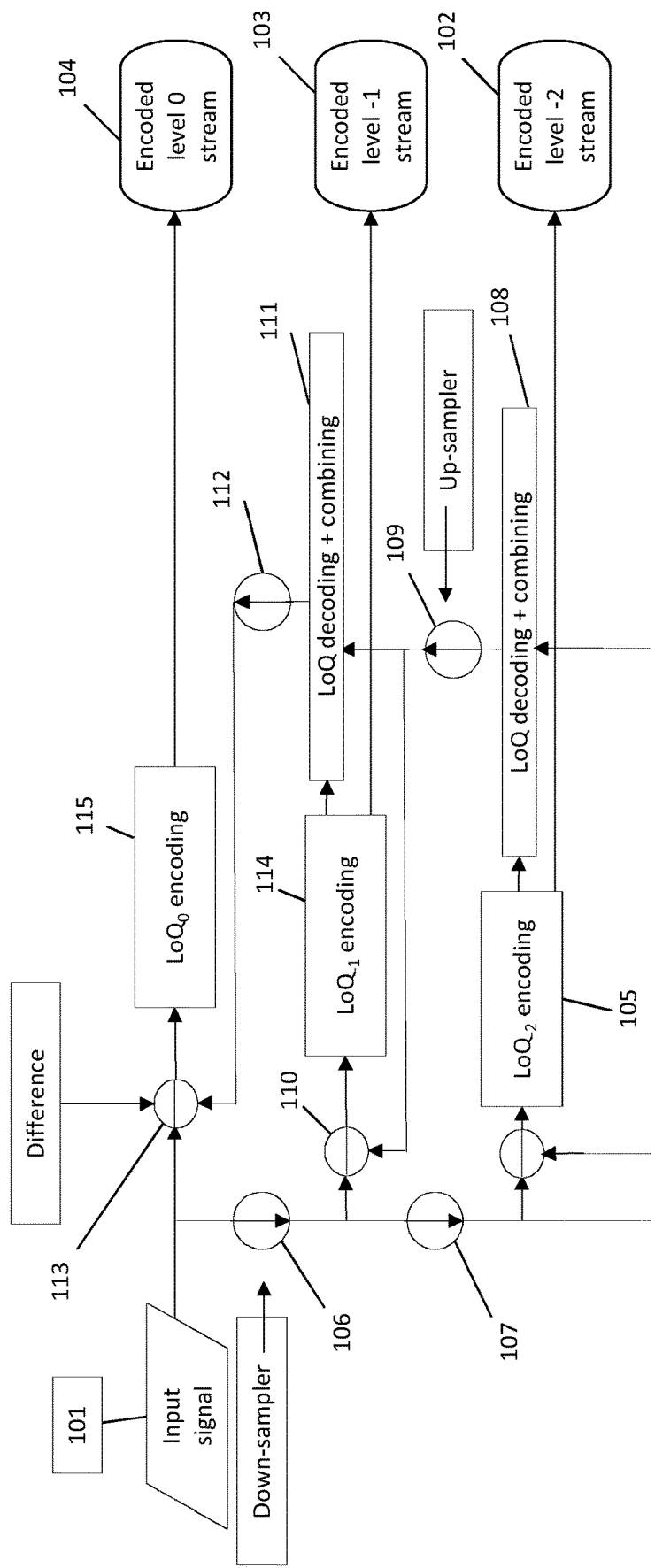
FIG. 1 shows a high-level schematic of an encoding process.

A generalised example of an encoding process according to these principles is depicted in the block diagram of FIG. 1. This generalised process aims to provide a hierarchy of levels of quality in a pyramidal manner. An input full resolution video 101 is processed to generate various encoded streams 102, 103, 104. A first encoded stream 102 (i.e. an encoded base stream) is produced by feeding a first encoding operation 105 with a down-sampled version of the input signal 101. In this example, two down-sampling operations 106, 107 are performed on the input signal or video 101 prior to encoding the signal using the first encoding operation 105. The two down-sampling operations result in a hierarchical structure of levels of quality being recreated at the decoder as will be seen below.

In this generalised example, the lowest level of quality, $LoQ_{-2}$, encoding may be performed using any suitable codec or encoding process 105. Note that throughout the present description the acronym LoQ may be used to represent level of quality.

The second level of quality, $LoQ_{-1}$, stream 103 is produced by decoding the first LoQ stream $LoQ_{-2}$ using the first codec, that is, the corresponding decoding process to the $LoQ_{-2}$ encoding process 105. The decoded first LoQ stream $LoQ_{-2}$ is then up-sampled, that is, an up-sampling operation 109 is applied to the decoded first LoQ stream $LoQ_{-2}$. A difference 110 between the up-sampled decoded first LoQ stream $LoQ_{-2}$ and the first down-sampled input signal 106 calculated to create a first set of residuals. The first set of residuals is then encoded using a second encoding operation 114 to generate second level of quality, $LoQ_{-1}$, stream 103. It will of course be understood that the second encoding operation may be the same as the first encoding operation or different in this generalised example.

A similar process is repeated to produce the third level of quality, $LoQ_0$, stream 104 which may substantially be identical to the input signal. It will be evident that the hierarchy is scaleable using any number of down-sampling operations. The up-sampled decoded first LoQ stream $LoQ_{-2}$ 109 is combined with a decoded second LoQ stream $LoQ_{-1}$ 111 which in turn is up-sampled 112 and a difference 113 calculated from the original input signal 101 to generate a second set of residuals. These residuals are then encoded using a third encoding operation 115 and using a third encoding operation to generate the third LoQ stream $LoQ_0$.

In general residuals refer to a difference between a value of a reference array or reference frame and an actual array or frame of data. It should be noted that this generalised example is agnostic as to the encoding operations performed and the nature of the input signal.

Each of the streams 102, 103, 104 may be sent independently in certain embodiments. That is, in the proposed method of encoding a signal, the signal may be encoded using at least two levels of encoding. A first level is encoded is performed using a first encoding algorithm and a second level is encoded using a second encoding algorithm. The method may comprise: obtaining a first portion of a bitstream by encoding the first level of the signal; obtaining a second portion of a bitstream by encoding the second level of the signal; and sending the first portion of the bitstream and the second portion of the bytestream as two independent bitstreams.

Figure 2:
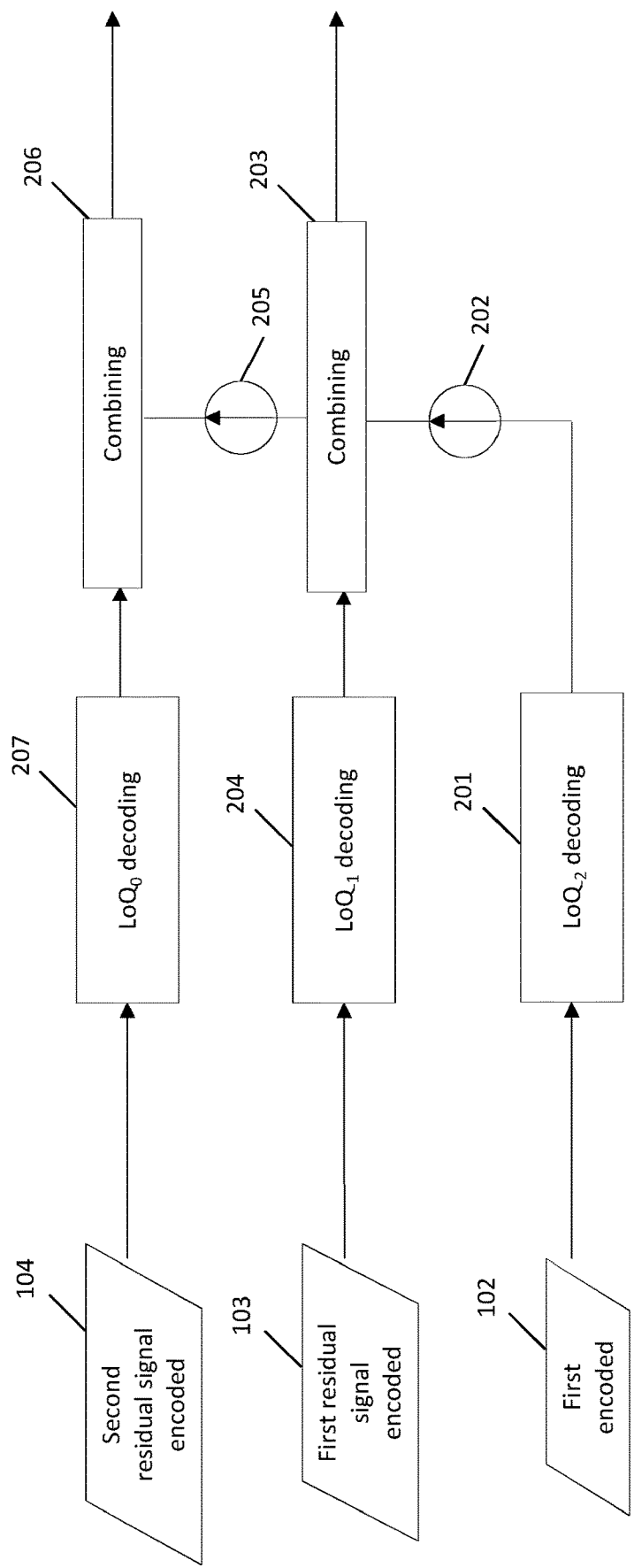
FIG. 2 shows a high-level schematic of a decoding process.

FIG. 2 illustrates a generalised decoding process for decoding the streams 102, 103, 104 generated by the encoding process of FIG. 1. The first LoQ stream $LoQ_{-2}$ is decoded using a corresponding decoding operation 201 to the first encoding operation. This recreates the version of the input signal following the two down-sampling operations and thus represents a version of the input signal, albeit at a low quality. The decoded first LoQ stream $LoQ_{-2}$ is then up-sampled 202 and combined 203 with a decoded second LoQ stream $LoQ_{-1}$ 204 (representing the first residuals) to recreate the input signal after the first down-sampling operation 106, that is the input video at a second level of quality higher than the first level of quality.

The output of the combining operation 203 is up-sampled 205 and combined 206 with a decoded third LoQ stream $LoQ_{-1}$ 207 (representing the second residuals) to recreate the input signal 101, that is the original input video is at a third level of quality higher than the first and second levels of quality.

Thus it can be seen that the generalised encoding and decoding process described herein provide a hierarchical, scaleable flexible coding technology. The first portion of a bitstream or first independent bitstream is to be decoded using a first decoding algorithm, and the second portion of the bitstream or second or independent bitstream is to be decoded using a second decoding algorithm. The first decoding algorithm is capable of being decoded by a legacy decoder using legacy hardware.

Figure 3:
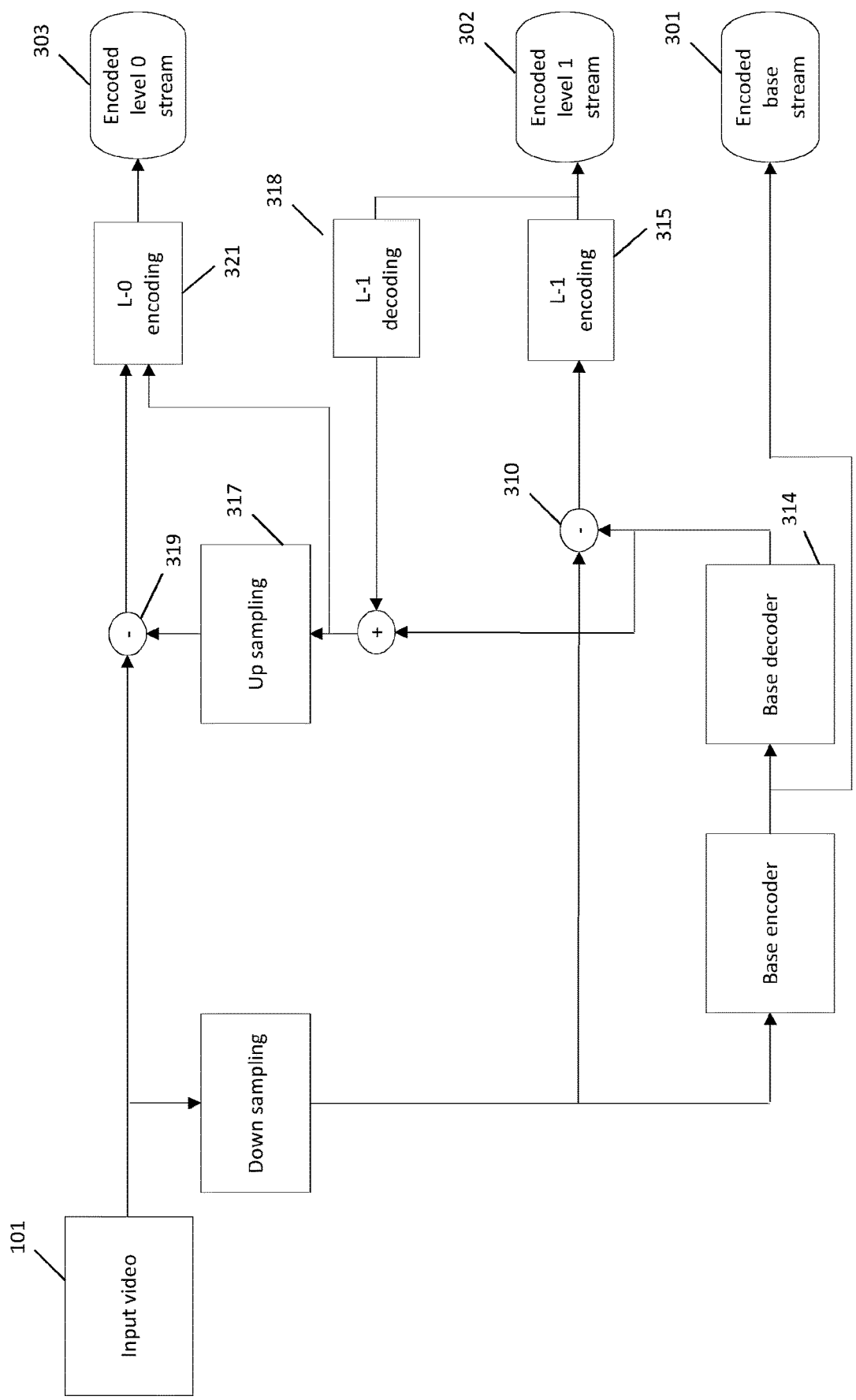
FIG. 3 shows an alternative high-level schematic of an encoding process.

Returning to the initial process described above providing a base stream and two levels of enhancement within an enhancement stream, an additional generalised encoding process is depicted in the block diagram of FIG. 3. An input full resolution video is processed to generate various encoded streams 301, 302, 303. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between the reconstructed base codec video and the down-sampled version of the input video. A third encoded stream (encoded level 0 stream) is produced by processing the residuals obtained by taking the difference between an up-sampled version of a corrected version of the reconstructed base coded video and the input video.

A down-sampling operation may be applied to the input video to produce a down-sampled video to be encoded by a base codec. The down-sampling can be done either in both vertical and horizontal directions, or alternatively only in the horizontal direction.

As will be noted when comparing FIGS. 1 and 3, each enhancement stream encoding process may not necessarily include an up-sampling step. In FIG. 3 for example the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded 314 (i.e. a decoding operation is applied to the encoded base stream to generate a decoded base stream). The difference between the decoded base stream and the down-sampled input video is then created 310 (i.e. a subtraction operation is applied to the down-sampled input video and the decoded base stream to generate a first set of residuals).

Here the term residuals is used in the same manner as that known in the art, that is, the error between a reference frame a desired frame. Here the reference frame is the decoded base stream and the desired frame is the down-sampled input video. Thus the residuals used in the first enhancement level can be considered as a corrected video as they 'correct' the decoded base stream to the down-sampled input video that was used in the base encoding operation.

The difference is then encoded 315 to generate the encoded Level 1 stream 302 (i.e. an encoding operation is applied to the first set of residuals to generate a first enhancement stream).

As noted above, the enhancement stream may comprise a first level of enhancement 302 and a second level of enhancement 303. The first level of enhancement 302 may be considered to be a corrected stream. The second level of enhancement 303 may be considered to be a further level of enhancement that converts the corrected stream to the original input video.

The further level of enhancement 303 is created by encoding a further set of residuals which are the difference 319 between an up-sampled 317 version of a decoded 318 level 1 stream and the input video 101.

As noted, an up-sampled stream is compared to the input video which creates a further set of residuals (i.e. a difference operation is applied to the up-sampled re-created stream to generate a further set of residuals). The further set of residuals are then encoded 321 as the encoded Level 0 enhancement stream (i.e. an encoding operation is then applied to the further set of residuals to generate an encoded further enhancement stream).

Thus, as illustrated in FIG. 3 and described above, the output of the encoding process is a base stream 301 and one or more enhancement streams 302, 303 which preferably comprise a first level of enhancement and a further level of enhancement.

Figure 4:
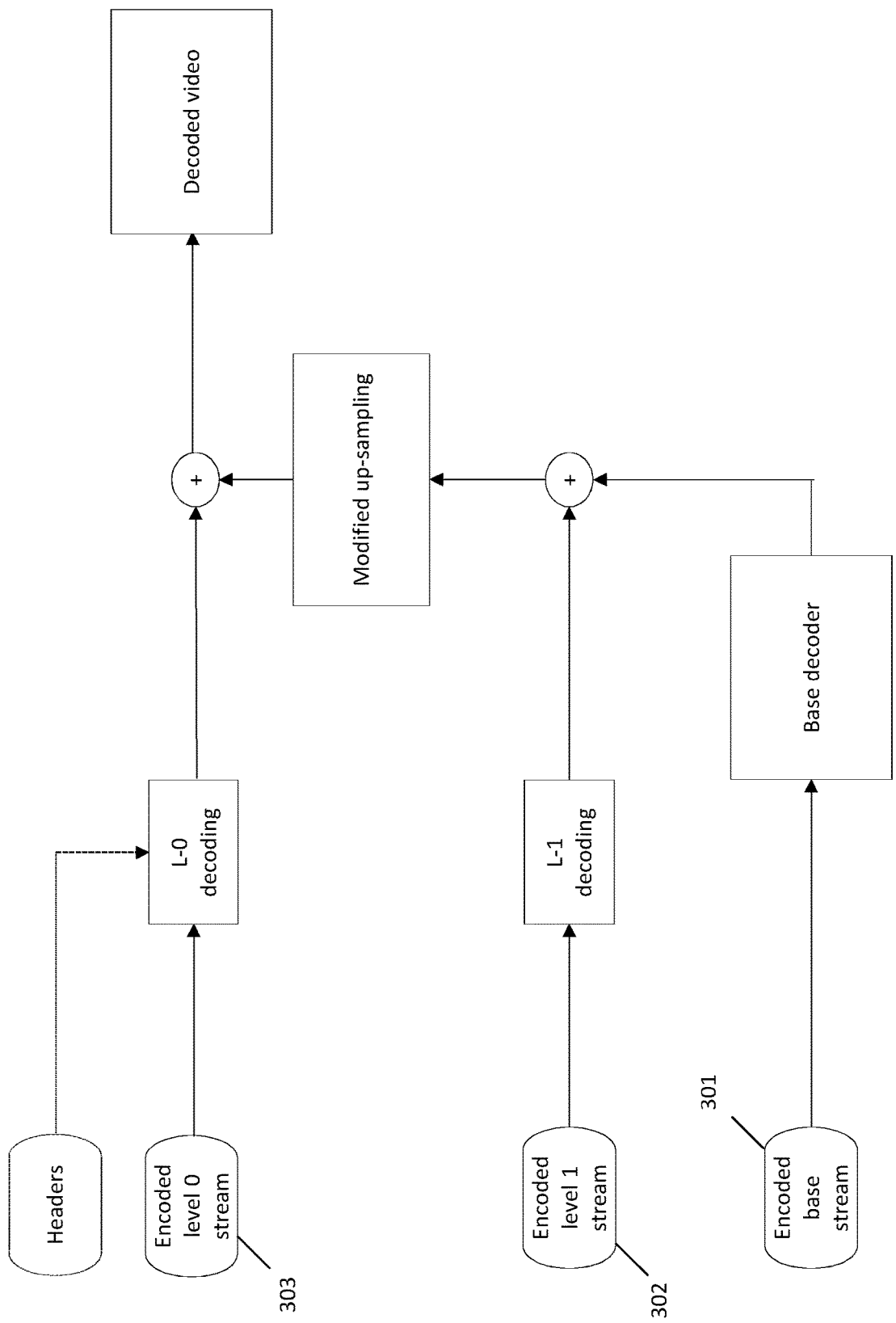
FIG. 4 shows an alternative high-level schematic of a decoding process.

A corresponding generalised decoding process is depicted in the block diagram of FIG. 4. The decoder receives the three streams 301, 302, 303 generated by the encoder together with headers containing further decoding information. The encoded base stream is decoded by a base decoder corresponding to the base codec used in the encoder, and its output is combined with the decoded residuals obtained from the encoded level 1 stream. The combined video is up-sampled and further combined with the decoded residuals obtained from the encoded level 0 stream.

In the decoding process, the decoder may parse the headers (global config, picture config, data block) and configure the decoder based on those headers. In order to re-create the input video, the decoder may decode each of the base stream, the first enhancement stream and the further enhancement stream. The frames of the stream may be synchronised and then combined to derive the decoded video.

In each of FIGS. 3 and 4, the level 0 and level 1 encoding operations may include the steps of transformation, quantization and entropy encoding, the latter using Huffmann and run length encoding for example. Similarly, at the decoding stage, the residuals may be passed through an entropy decoder, a de-quantizer and an inverse transform module. These steps are optional. Any suitable encoding and corresponding decoding operation may be used. Preferably however, the level 0 and level 1 encoding steps may be performed in software.

As noted above, the enhancement streams may each be transmitted as two independent bitstreams. The following provides a further technique for transmitting the enhancement information.

In an embodiment, enhancement data corresponding to residual data are embedded in an elementary stream (ES). As will be understood, an elementary stream (ES) as defined by the MPEG communication protocol is usually the output of an audio or video encoder. ES contains only one kind of data (e.g. audio, video, or closed caption). An elementary stream is often referred to as "elementary", "data", "audio", or "video" bitstreams or streams.

The building blocks of an elementary stream of several known video coding standards are Network Abstraction Layer (NAL) units. Typically, coded video data is organized into NAL units, each of which is effectively a packet that contains an integer number of bytes.

A NAL unit is a syntax structure containing an indication of the type of data to follow and bytes containing that data in the form of a Raw Byte Sequence Payload (RBSP) interspersed as necessary with emulation prevention bytes. A NAL unit stream is a sequence of NAL units.

In H.264 for example, there is a relationship between the NAL unit stream and byte stream, either of which are referred to as the bitstream. The NAL unit stream format is conceptually the more "basic" type. It consists of a sequence of syntax structures called NAL units. This sequence is typically ordered in decoding order. There are constraints imposed on the decoding order (and contents) of the NAL units in the NAL unit stream. The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

In one embodiment, each or both enhancement stream may be encapsulated into one or more enhancement bitstreams using a set of NAL units. The NAL units are meant to encapsulate the enhancement bitstream. The NAL unit may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). Similarly, the NAL unit may comprise ordering information indicating an order of the NAL units in decoding or viewing order, that is, the NAL unit may comprise an order of the information included within that NAL unit.

In a further embodiment, by reference to T-REC-H.264—https://www.itu.int/rec/T-REC-H.264-201704-I/en, (incorporated herein by reference), there is a Network Abstraction Layer (NAL) unit, with a type 0x06 (SEI). Its data contains supplemental enhancement information (SEI) payload(s) and the format is described in Annex B (B.1) of T-REC-H.264.

Supplemental enhancement information (SEI) payloads typically contain data such as picture timing information. An example of the use of SEI is to carry scene information such as to label pictures with scene identifiers or to indicate scene changes or specify scene transmission.

In the H.264 standard there is a single SEI payload having a specified syntax as mentioned in sections 7.3.2.3/7.3.2.3.1/7.4.2.3.1. An SEI payload type of 0x05 (user_data_unregistered (list of types in D.1.1, description of syntax in D.1.7)) is specified, using also a specific UUID.

In certain embodiments, the enhancement data are included in this SEI payload. That is, the first level of enhancement or the second level of enhancement or both may be included in this SEI payload.

By incorporating the enhancement data into the SEI payload, it is possible to synchronise the residuals of the enhancement levels with the frames of the base stream.

The NAL unit is so generated and transmitted to a decoding device. This NAL unit corresponds to an SEI type which contains the encoded bitstream.

The decoding device receives said Supplemental Enhancement Information (SEI) message, it parses it to obtain the encoded bitstream, said encoded bitstream containing encoded information which is associated with information of an original signal; and decodes said encoded bitstream to obtain decoded information which is used to reconstruct the original signal (e.g., the enhancement data).

Further, the encoding device may combine the SEI NAL with one or more base video NAL units (corresponding to a different layer of encoding of the original signal), thus obtaining an Access Unit typically delineating a "frame" of data. Multiple access units make an elementary stream, and send it in whatever format is needed, e.g. mp4 or TS.

Legacy encoders/decoders may ignore SEI messages. New encoders/decoders use SEI messages.

In an alternative embodiment, the NAL unit into which the encoded data is inserted may be a reserved type of NAL unit. That is, the type may indicate to legacy decoders that it should be ignored but modified decoders may identify the NAL unit in order to process the data. That is, video coding data of the enhancement data may have reserved values of nal_unit_type according to the base video coding standard (e.g. H.264).

In this embodiment, the reserved type of NAL unit may also be combined with a NAL unit of the base video to obtain an Access Unit delineating a "frame" of data.

In a further alternative embodiment, the NAL unit into which the encoded data is inserted may be an unspecified type of NAL unit. Similarly, the NAL unit may be a type 0. That is, the type may indicate to legacy decoders that it should be ignored but modified decoders may identify the NAL unit in order to process the data. That is, video coding data of the enhancement data may have unspecified values of nal_unit_type according to the base video coding standard (e.g. H.264).

In this embodiment, the unspecified or 0 type of NAL unit may also be combined with a NAL unit of the base video to obtain an Access Unit delineating a "frame" of data.

In the reserved and unspecified examples, the NAL unit may be specifically configured for the purpose of sending the enhancement information. For example, a NAL unit may indicate a level of quality (with multiple NAL units or levels in each access unit in examples). The type may differ depending on the level of quality or all NAL units comprising enhancement information may have the same type (reserved or unspecified according to the base video coding standard) with the level indicated in a header or other metadata. Similarly, the level may be indicated by order of NAL units received or transmitted.

Each NAL unit may be configured specifically to include certain headers or metadata so that the information may be properly decoded and may accordingly have a pre-defined syntax structure which can be ignored by legacy decoders, because of its type. Each NAL unit of this type may comprise metadata such as the number of bytes in the payload. The bytes in the NAL unit may be arranged into a decoding order an arranged into a raw stream. Each NAL unit may comprise a start sequence of predefined bits to enable a decoder to identify a start of an enhancement NAL unit in the stream.

The following describes an example of processing a series of NAL units which comprise the enhancement data. Input to this example process is a bitstream. Output of this process is a list of enhancement residuals surfaces to be added to the base decoder reconstructed pictures (L-1 level of enhancement) and a list of residuals surfaces to be added to the upscaled picture resulting from the L-1 level of enhancement (L-0 level of enhancement).

A payload data block unit process may be applied to the input bitstream. The payload data block unit process may comprise separating the input bitstream into data blocks, where each data block is encapsulated into a Network Abstraction Layer Unit (NALU). The NALU is used to synchronise the enhancement levels with the base level.

The general bitstream structure may be:

[NALU START] [Version] [data block] . . . [data block] [NALU END]

Each data block may comprise a header and a payload. The method may comprise parsing each data block to derive a header and a payload where the header comprises configuration metadata to facilitate decoding and the payload comprises encoded data.

In certain embodiments, the configuration data may be in the header of a NALU or may be embedded in the payload of a NALU with the payload of the NALU defining its own structure, that is, the payload of the NALU may itself be split into a header and payload.

Multiple NALUs can be combined to generate a byte sequence payload.

Figure 5:
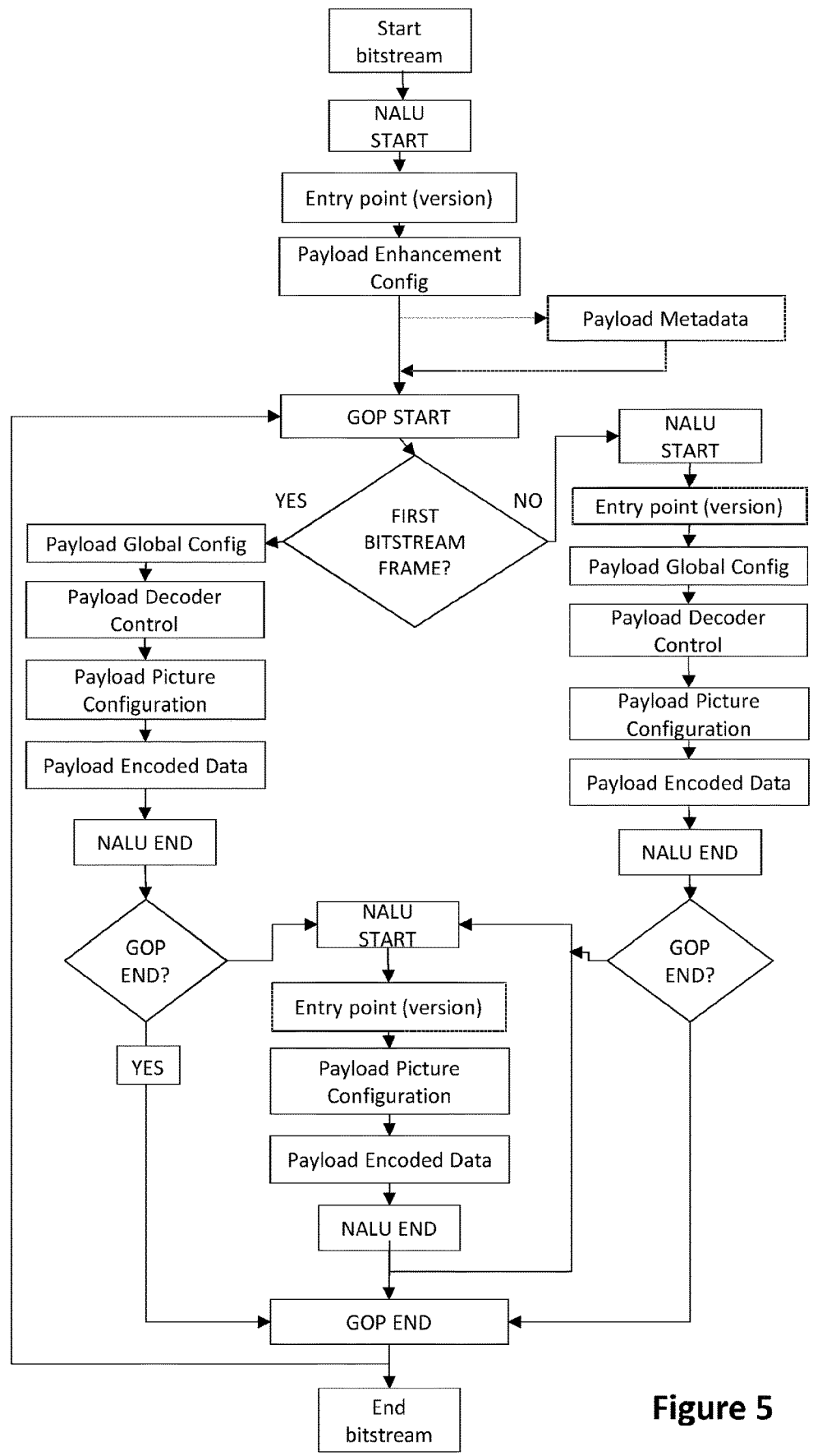
FIG. 5 shows a process of separating a bitstream into data blocks.

FIG. 5 describes an example flow which facilitates separation of an enhancement bitstream according to the present disclosure. The bitstream begins with a Network Abstraction Layer Unit (NALU) start. Next, is an entry point. An entry point indicates which version of the software should be used to decode the stream. The stream next includes a payload enhancement configuration. The payload enhancement configuration indicates parameters of the payload. The payload enhancement configuration may be signalled once per stream. Optionally, the payload enhancement configuration may be signalled multiple times per group of pictures (GOP) or for each NALU.

Although the term group of pictures is used here in respect of decoding the enhancement stream, it will be understood that this term is used to refer to a corresponding structure to that of the base stream but not to define a particular structure on the enhancement stream. That is, enhancement streams may not have a GOP structure in the strict sense and strict compliance with GOP structures of the art is not required for the enhancement stream.

As mentioned, the GOP may be a structure of the base stream to which the enhancement team corresponds. Where the base stream is an H.264 encoded signal, the H.264 encoding can involve arranging a sequence of images into a Group of Pictures (GOP). Each image in the GOP is representative of a different time sample of the signal. A given image in the GOP may be encoded using one or more reference images associated with earlier and/or later time samples from the same GOP, in a process known as 'inter-frame prediction'.

In certain embodiments, each frame of the enhancement data corresponds to a frame of the base stream and is thus included in a similar GOP structure as the base stream or in the same GOP and/or in the same access unit.

If payload metadata is included, it may be included after the payload enhancement configuration and before the set of groups of pictures. Payload metadata may for example include HDR information.

The method may further comprise retrieving a GOP. If the NALU is the first bitstream frame, the method may further comprise retrieving a payload global configuration. The payload global configuration may indicate parameters of the decoding process. The payload global configuration may be retrieved once for each GOP.

The method may then further comprise retrieving a set of payload decoder control parameters which indicate to the decoder parameters to be enabled during decoding, such as dithering or upsampling parameters. The payload decoder control parameters may be retrieved for each GOP.

The method may then further comprise retrieving a payload picture configuration from the bitstream. The payload picture configuration may comprise parameters relating to each picture or frame, for example, a step width. The payload picture configuration may be retrieved once for each NALU (that is, once for each picture or frame).

The method may then further comprise retrieving a payload of encoded data which may comprise encoded data of each frame. The payload of encoded data may be signalled once for each NALU (that is, once for each picture or frame). The payload of encoded data may comprise a surface, plane or layer of data which may be separated into chunks as described below.

After the payload of encoded data is retrieved, the NALU may end.

If the GOP also ends, the method may continue to retrieve a new NALU for a new GOP. If the NALU is not the first bitstream frame (as is the case here), then the NALU may then, optionally, retrieve an entry point (i.e. an indication of a software version to be used for decoding). The method may then retrieve a payload global configuration, payload decoder control parameters and payload picture configuration. The method may then retrieve a payload of encoded data. The NALU will then end.

After each NALU, if the GOP has not ended, the method may comprise retrieving a new NALU from the stream. For each second and subsequent NALU of each GOP, the method may optionally retrieve an entry point indication the software version to be used in decoding and the method may comprise retrieving payload picture configuration parameters and a payload of encoded data for the NALU.

As above, if the NALU is not the last NALU for the GOP, the method may comprise retrieving a further NALU. If the NALU is the last NALU in the GOP, the method may comprise retrieving a further GOP and accordingly a first NALU of the further GOP, as above.

Once all GOPs have been retrieved the bitstream will end.

Figure 6:
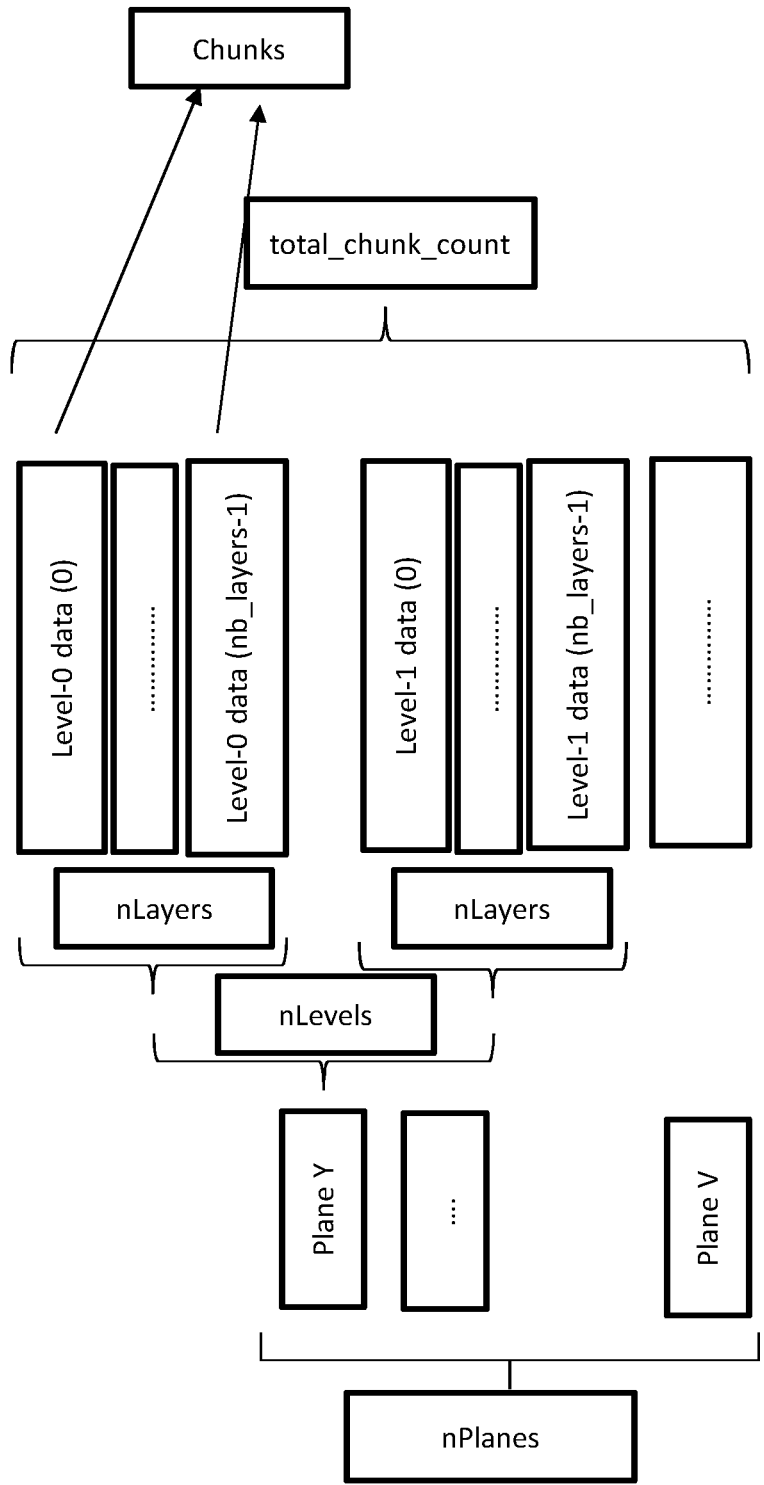
FIG. 6 shows a hierarchical ordering of data.

FIG. 6 illustrates organisation of chunks of data in the payload of encoded data. The method may comprise retrieving a set of encoded data. The method may be performed following the headers decoding process described above. The method may out a set of entropy encoded coefficients grouped be plane, levels of enhancement or layers. As mentioned, each picture of each NALU may be preceded by picture configuration payload parameters.

The encoded data may be separated into chunks. Each payload may be ordered hierarchically into chunks. That is, each payload is grouped into planes, then within each plane each level is grouped into layers and each layer comprises a set of chunks for that layer. Level represents each level of enhancement (first or further) and layer represents a set of transform coefficients.

The method may comprise retrieving chunks for two levels of enhancement for each plane. The method may comprise retrieving 16 layers for each level. Thus each payload is ordered into a set of chunks for all layers in each level and then the set of chunks for all layers in the next level of the plane. Then the payload comprises the set of chunks for the layers of the first level of the next plane and so on.

Thus, the method may decode the headers in the manner above and output entropy encoded coefficients grouped by plane, levels and layers belonging to the picture enhancement being decoded. Thus the output may be (nPlanes)×(nLevel)×(nLayer) array surfaces with elements surfaces [nPlanes][nLevel][nLayer].

Figure 7:
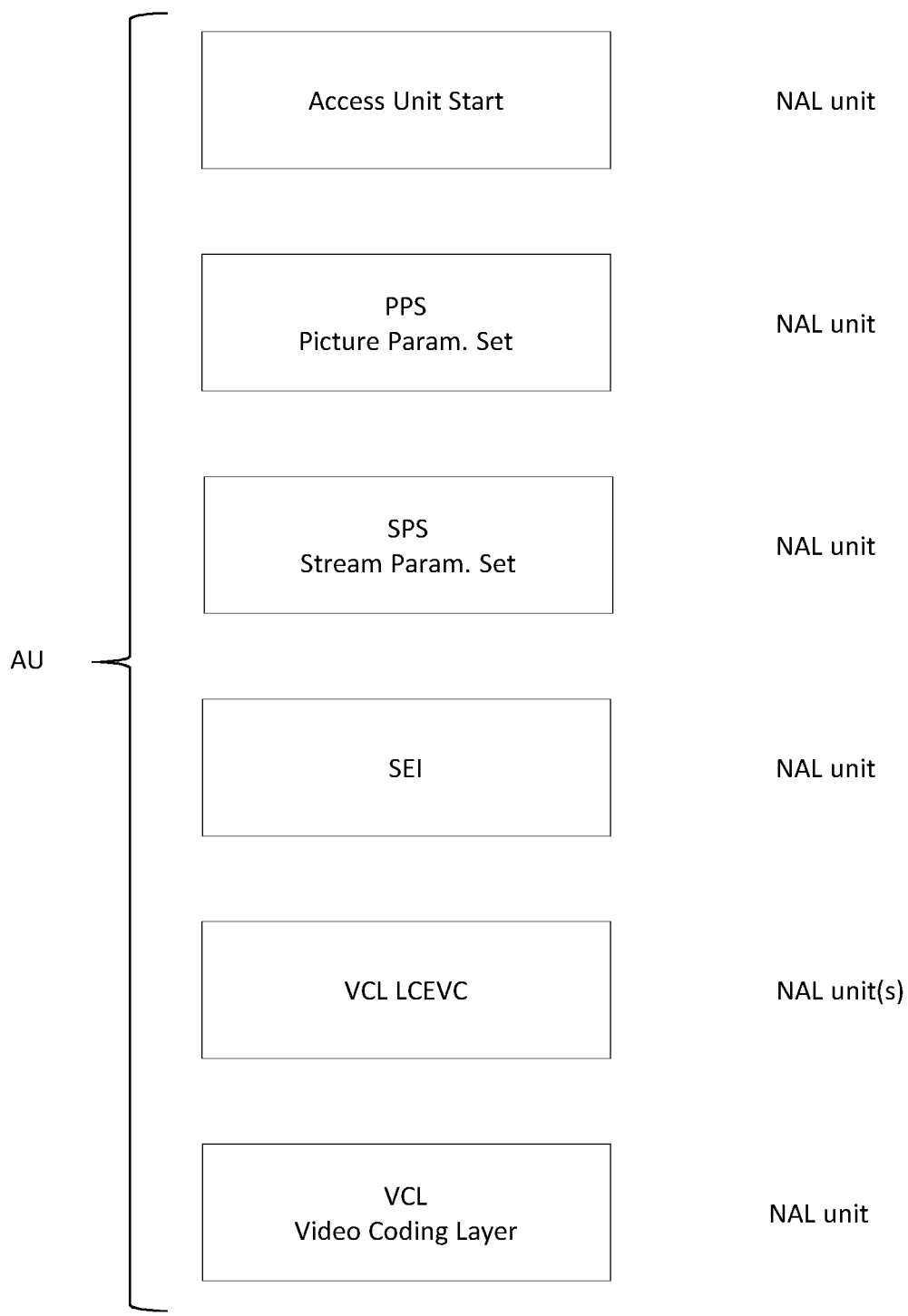
FIG. 7 shows a high-level structure of an Access Unit.

FIG. 7 illustrates an example of an access unit. It was noted above that multiple NAL units may be combined to create an access unit. Each NAL unit may be of a specific type depending on the data included in the unit. In certain examples, an access unit may represent a frame of a video. In the illustrated example of FIG. 7, the access unit comprises optional NAL units representing metadata. For example, there is an optional NAL unit that indicates the start of of an access unit. Next there may be includes a Picture Parameter Set (PPS) which comprises metadata of the picture. There may also be included a Stream Parameter Set (SPS) NAL unit which comprises metadata for a stream. This NAL unit may preferably be included in a first access unit of a sequence but not subsequently.

In an example, there may be included an SEI NAL unit. This may have SEI information included as exemplified in the art or may optionally include enhancement data as described above.

Additionally or alternatively, enhancement data may be included in a NAL unit or NAL units in the Access Unit according to a video coding layer. Here the NAL unit is referred to as a Low Complexity Enhancement Video Coding NAL unit. That is, a NAL unit comprising enhancement or correction information as described herein.

In the same Access Unit there may also be included a base Video Coding Layer (VCL) NAL unit. That is, a VCL NAL unit comprising base stream information according to the base coding operation or the legacy coding operation.

In this way, an Access Unit comprises a VAL NAL unit comprising enhancement information and a VCL NAL unit comprising base information.

In examples, each frame may be an Access Unit comprising a set of encoded residuals and encoded information representing the video.

In summary, there may be defined a NAL unit for aspects of the invention described herein which is specifically defined and configured to comprise enhancement information. Each frame of the video may be defined by a combination of NAL units (LCEVC+base) in an independent Access Unit.

It will be understood that, in the art, the encoding and decoding order of a set of frames or a set of NAL units or Access Units may be different from a viewing order of the frames. For example, the second frame decoded may be the fourth frame when reordered for display. In one example, the enhancement stream may be sent in the same order as the base stream to facilitate re-ordering. In an additional or alternative example, the enhancement stream may be combined and associated with the base stream to facilitate re-ordering at the decoder. In a further example, the enhancement stream may comprise additional information that provides an order of the NAL units to the decoder to facilitate re-ordering. The additional information may be a reference index indicating a frame of the base stream to which the enhancement information is to be combined or may include an order of the enhancement frames so that the order can be identified and linked to the base frames.

A process of ordering base and enhancements from NAL units is as follows.

At the encoder side, first, the base encoder (for example, AVC or HEVC) encodes a number of frames (e.g., N look-ahead frames). Once a first number of frames has been encoded (for example, after the first frame has been encoded), the enhancement encoder starts the operations.

In order to do so, the enhancement encoder decodes the NALU from the base encoder and, in doing so, it extracts some information about the base encoded frames, for example picture type (e.g., I-frame, P-Frame, B-Frame, etc.), quantization parameter (QP) used, etc. Among these parameters, it extracts the picture order count (POC). The POC identifies the order in which that frame should be presented.

For example, assume we have three frames I, P, B. The encoding order would be I, P, B, but in presentation order you would have I, B, P. In this example, the POC would be 0, 2, 1, i.e. I-frame is frame #0, P-frame is frame #2, and B-frame is frame #1.

The enhancement encoder uses the POC to know to which of the base encoded/decoded frame a corresponding enhancement frame should be associated with. Further, an identifier may be used to identify the order of the enhancement frames. In this way, the enhancement frames and base frames are synched and ensured they are presented in the correct order.

The enhancement frame can then be encapsulated into a separate NAL (or a SEI message) from the NAL of the base frame.

Figure 8:
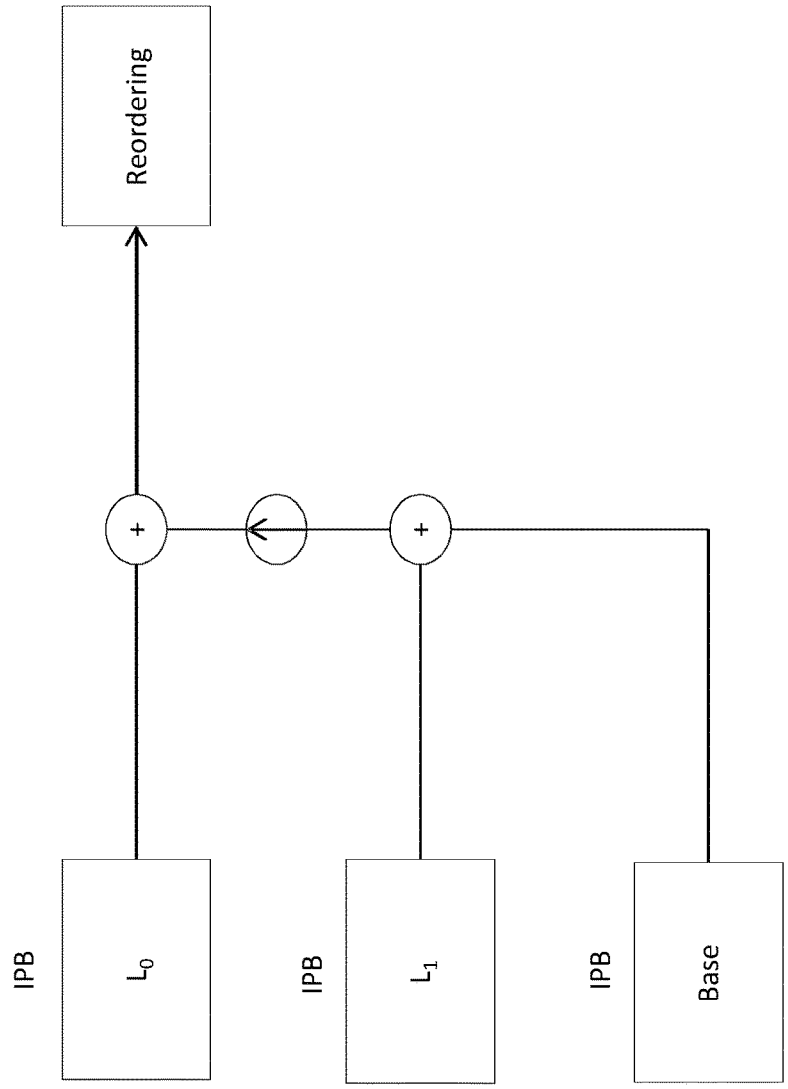
FIG. 8 shows a high-level flow of re-ordering frames and received data blocks.

FIG. 8 illustrates a high-level flow of re-ordering at a decoder. Here, the I, P and B frames are sent for each stream in their decoding order. Each frame is decoded and combined with the higher level (including up-sampling as described above) before the I, P and B frames are re-ordered. That is, each frame is decoded and processed before re-ordering for display.

The method thus can be considered to comprise decoding information comprised in a NAL unit of an enhancement stream, decoding information comprised in a NAL unit of a base stream, combining the enhancement information with the base information to reconstruct a plurality of frames and re-ordering the frames into a viewing order to reconstruct an original video.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The following provides an example implementation of a NAL unit description in accordance with aspects described herein. In this example, a NAL unit is specifically configured to comprise enhancement information and has an unspecified type according to a base video coding standard.

|  | C | Descriptor |
|---|---|---|
| nal_unit(NumBytesInNALunit) { |  |  |
|   nal_unit_header( ) |  |  |
|   NumBytesInRBSP = 0 |  |  |
|   for (i = 2; i < NumBytesInNALunit; i++) { |  |  |
|     if (i + 2 < NumBytesInNALunit && next_bits( 24 ) == 0x000003) { |  |  |
|       rbsp_byte[ NumBytesInRBSP++ ] | All | b(8) |
|       rbsp_byte[ NumBytesInRBSP++ ] | All | b(8) |
|       i += 2 |  |  |
|       emulation_prevention_three_byte /* equal to 0x03 */ | All | f(8) |
|     } else |  |  |
|       rbsp_byte[ NumBytesInRBSP++ ] | All | b(8) |
|     } |  |  |
|   } |  |  |
| } |  |  |
| nal_unit_header( ) { |  |  |
|   forbidden_zero_bit | All | f(1) |
|   nal_unit_type | All | u(6) |

-continued

|  | C | Descriptor |
|---|---|---|
|   nuh_layer_id | All | u(6) |
|   nuh_temporal_id_plus1 | All | u(3) |
| } |  |  |

Layer id is used for spatial scalability.

Temporal id is used for temporal scalability.

Neither of the two is used in LCEVC.

We can leave the second byte of nal_unit_header for "future extensions" or remove the second byte altogether.

General NAL Unit Semantics

NumBytesInNalUnit specifies the size of the NAL unit in bytes. This value is required for decoding of the NAL unit. Some form of demarcation of NAL unit boundaries is necessary to enable inference of NumBytesInNalUnit. Other methods of demarcation may be specified.

rbsp_byte[i] is the i-th byte of an RBSP. An RBSP is specified as an ordered sequence of bytes as follows:

The RBSP contains a string of data bits (SODB) as follows:

If the SODB is empty (i.e., zero bits in length), the RBSP is also empty.

Otherwise, the RBSP contains the SODB as follows:

1) The first byte of the RBSP contains the (most significant, left-most) eight bits of the SODB; the next byte of the RBSP contains the next eight bits of the SODB, etc., until fewer than eight bits of the SODB remain.

2) rbsp_trailing_bits( ) are present after the SODB as follows:

i) The first (most significant, left-most) bits of the final RBSP byte contains the remaining bits of the SODB (if any).

ii) The next bit consists of a single rbsp_stop_one_bit equal to 1.

iii) When the rbsp_stop_one_bit is not the last bit of a byte-aligned byte, one or more rbsp_alignment_zero_bit is present to result in byte alignment.

Syntax structures having these RBSP properties are denoted in the syntax tables using an "_rbsp" suffix. These structures are carried within NAL units as the content of the rbsp_byte[i] data bytes. The association of the RBSP syntax structures to the NAL units is as specified in the table below.

NOTE 2—When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

emulation_prevention_three_byte is a byte equal to 0x03. When an emulation_prevention_three_byte is present in the NAL unit, it shall be discarded by the decoding process.

The last byte of the NAL unit shall not be equal to 0x00.

Within the NAL unit, the following three-byte sequences shall not occur at any byte-aligned position:

0x000000

0x000001

0x000002

Within the NAL unit, any four-byte sequence that starts with 0x000003 other than the following sequences shall not occur at any byte-aligned position:
0x00000300
0x00000301
0x00000302
NAL Unit Header Semantics
forbidden_zero_bit shall be equal to 0.
nal_unit_type specifies the type of RBSP data structure contained in the NAL unit as specified in the table below.
NAL units that have nal_unit_type in the range of UNSPEC48 . . . UNSPEC63, inclusive, for which semantics are not specified, shall not affect the decoding process specified.

| NAL unit type codes and NAL unit type classes | | | |
| --- | --- | --- | --- |
| nal_u-nit_type | Name of nal_unit_type | Content of NAL unit and RBSP syntax structure | NAL unit type class |
| 0 | LCELEVEL | Coded segment of a Low Complexity Enhancement Level | VCL |
| 1 . . . 63 | UNSPEC01 . . . UNSPEC63 | UN-Unspecified | Non VCL |

NOTE 1—NAL unit types in the range of UNSPEC01 . . . UNSPEC63 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values.

For purposes other than determining the amount of data in the decoding units of the bitstream, decoders shall ignore (remove from the bitstream and discard) the contents of all NAL units that use reserved values of nal_unit_type.

NOTE 2—This requirement allows future definition of compatible extensions to this Specification.

Statements

The following statements describe certain aspects of the inventions described and illustrated herein.

1. A method of encoding a signal, the method comprising:
    encoding a version of the signal to produce a first encoded signal;
    decoding said first encoded signal to produce a first decoded signal;
    up-sampling said first decoded signal to obtain a first up-sampled decoded signal;
    obtaining a first residual signal by difference between said first up-sampled decoded signal and a first reference signal; and
    encoding said first residual signal to produce a first encoded residual signal.

2. The method of embodiment 1, wherein the version of the signal is obtained by down-sampling the signal prior to encoding it.

3. The method of embodiment 2, wherein the first reference signal corresponds to the signal prior to down-sampling it.

4. The method of any of the above embodiments, wherein the first encoded signal is produced using a first encoding algorithm and the first encoded residual signal is produced by using a second encoded algorithm, and wherein the first and second encoding algorithms are different.

5. The method of any of the above embodiments, further comprising:
    decoding said first encoded residual signal to obtain a second decoded signal;
    obtaining a second residual signal by difference between said second decoded signal and a second reference signal; and
    encoding said second residual signal to produce a second encoded residual signal.

6. The method of embodiment 5, wherein the second encoded residual signal is produced by using the second encoded algorithm.

7. The method of any one of embodiments 1 to 4, further comprising:
    decoding said first encoded residual signal to obtain a second decoded signal;
    up-sampling said second decoded signal to obtain a second up-sampled decoded signal;
    obtaining a second residual signal by difference between said second up-sampled decoded signal and a second reference signal; and
    encoding said second residual signal to produce a second encoded residual signal.

8. The method of embodiment 7, wherein the second reference signal corresponds to the signal prior to down-sampling it, wherein the down-sampling of the second reference signal results in the first reference signal.

9. A method of decoding a signal, the method comprising:
    receiving a first encoded signal and a first encoded residual signal;
    decoding said first encoded signal to obtain a first decoded signal;
    up-sampling said first decoded signal to obtain a first up-sampled decoded signal;
    decoding said first encoded residual signal to obtain a first decoded residual signal; and
    combining at least said first up-sampled decoded signal and said first decoded residual signal to obtain a first combined decoded signal.

10. The method of embodiment 6, further comprising:
    receiving a second encoded residual signal;
    decoding said second encoded residual signal to obtain a second decoded residual signal; and
    combining the first combined decoded signal and the second decoded residual signal to obtain a second combined decoded signal.

11. A method of encoding a signal, wherein the signal is encoded using at least two levels of encoding, wherein a first level is encoded using a first encoding algorithm and a second level is encoded using a second encoding algorithm, the method comprising:
    obtaining a first portion of a bitstream by encoding the first level of the signal;
    obtaining a second portion of a bitstream by encoding the second level of the signal; and
    combining the first portion and second portion of the bitstream to form a combined bytestream.

12. The method of embodiment 11, further comprising the step of sending said combined bitstream to a decoder.

13. A method of encoding a signal, wherein the signal is encoded using at least two levels of encoding, wherein a first level is encoded using a first encoding algorithm and a second level is encoded using a second encoding algorithm, the method comprising:
    obtaining a first portion of a bitstream by encoding the first level of the signal;

obtaining a second portion of a bitstream by encoding the second level of the signal; and sending the first portion of the bitstream and the second portion of the bytestream as two independent bitstreams.

14. The method of anyone of embodiments 11 to 13, wherein the first portion of the bitstream is to be decoded using a first decoding algorithm, and the second portion of the bitstream is to be decoded using a second decoding algorithm.

15. The method of embodiment 14, wherein the first decoding algorithm is capable of being decoded by legacy decoder using legacy hardware.

16. A method of decoding an encoded signal, wherein the signal is encoded using at least two levels of encoding, wherein a first level is encoded using a first encoding algorithm and a second level is encoded using a second encoding algorithm, the method comprising:

obtaining a bitstream, wherein the bitstream comprises at least a first portion and a second portion, wherein the first portion is encoded using the first encoding algorithm and corresponds to the first level of encoding, and wherein the second portion is encoded using the second encoding algorithm and corresponds to the second level of encoding;

selecting said first portion of the bitstream;

decoding said first portion of the bitstream using a first decoding algorithm to obtain a first decoded portion of the signal;

selecting said second portion of the bitstream;

decoding said second portion of the bitstream using a second decoding algorithm to obtain a second decoded portion of the signal; and combining at least the first decoded portion and the second decoded portion to obtain a decoded combined signal.

17. The method of embodiment 16, wherein the first portion is identified using a first identifier, the second portion is identified using a second identifier, and wherein the selection is performed by using said identifiers and determining the corresponding portions.

18. A method of decoding an encoded signal, wherein the signal is encoded using at least two levels of encoding, wherein a first level is encoded using a first encoding algorithm and a second level is encoded using a second encoding algorithm, the method comprising:

obtaining a first bitstream, wherein the first bitstream is derived using the first encoding algorithm and corresponds to the first level of encoding;

decoding said first e bitstream using a first decoding algorithm to obtain a first decoded portion of the signal;

obtaining a second bitstream, wherein the second bitstream is derived using the second encoding algorithm and corresponds to the second level of encoding;

decoding said second bitstream using a second decoding algorithm to obtain a second decoded portion of the signal; and combining at least the first decoded portion and the second decoded portion to obtain a decoded combined signal.

19. The method of embodiment 16, wherein decoding the second portion is done by using existing dedicated hardware designed to decode accordingly to the second decoding algorithm.

20. The method of embodiment 19, wherein decoding the first portion is done by using a software implementation designed to decode accordingly to the first decoding algorithm, and wherein the combination of the first decoded portion and the second decoded portion is performed using a software implementation.

The following statements describe preferred or exemplary aspects described and illustrated herein.

A method of encoding an input video into a plurality of encoded streams, such that the encoded streams may be combined to reconstruct the input video, the method comprising:

receiving a full resolution input video;

downsampling the full resolution input video to create a downsampled video;

encoding the downsampled video using a first codec to create a base encoded stream;

reconstructing a video from the encoded video to generate a reconstructed video;

comparing the reconstructed video to the input video; and, creating one or more further encoded streams based on the comparison.

The input video compared to the reconstructed video may be the downsampled video.

According to an example method, comparing the reconstructed video to the input video comprises:

comparing the reconstructed video to the downsampled video to create a first set of residuals and wherein creating the one or more further encoded streams comprises encoding the first set of residuals to create a first level encoded stream.

The input video compared to the reconstructed video may be the full resolution input video and the reconstructed video may be upsampled.

According to an example method, comparing the reconstructed video to the input video comprises:

upsampling the reconstructed video to generate an up-sampled reconstructed video; and, comparing the up-sampled reconstructed video to the full resolution input video to create a second set of residuals and wherein creating the one or more further encoded streams comprises encoding the second difference to create a second level encoded stream.

Accordingly, in an example, the method may generate a base encoded stream, a first level encoded stream and a second level encoded stream according to the above defined example methods. Each of the first level encoded stream and the second level encoded stream may contain enhancement data used by a decoder to enhance the encoded base stream.

Residuals may be a difference between two videos or frames.

The encoded streams may be accompanied by one or more headers which include parameters indicating aspects of the encoding process to facilitate decoding. For example, the headers may include the codec used, the transform applied, the quantization applied, and/or other decoding parameters.

An example method, further comprises:

sending the base encoded stream.

An example method, further comprises:

sending the first level encoded stream.

An example method, further comprises:

sending the second level encoded stream.

According to a further aspect of the present disclosure there is provided a decoding method.

A method of decoding a plurality of encoded streams into a reconstructed output video, the method comprising:

receiving a first base encoded stream;

decoding the first base encoded stream according to a first codec to generate a first output video;

receiving one or more further encoded streams;

decoding the one or more further encoded streams to generate a set of residuals; and, combining the set of residuals with the first video to generate a decoded video.

In an example, the method comprises retrieving a plurality of decoding parameters from a header. The decoding parameters may indicate which procedural steps were included in the encoding process.

In an example the method may comprise receiving a first level encoded stream and receiving a second level encoded stream. In this example the step of decoding the one or more further encoded streams to generate a set of residuals comprises:

decoding the first level encoded stream to derive a first set of residuals; wherein the step of combining the set of residuals with the first video to generate a decoded video, comprises:

combining the first set of residuals with the first output video to generate a second output video;

upsampling the second output video to generate an upsampled second output video;

decoding the second level encoded stream to derive a second set of residuals; and, combining the second set of residuals with the second output video to generate a reconstructed output video.

The method may further comprise displaying or outputting the reconstructed output.

The invention claimed is:

1. A method of decoding a bitstream, the method comprising:

receiving a first Network Abstraction Layer, NAL, unit;

parsing the first NAL unit to obtain an encoded bitstream, said encoded bitstream containing encoded information which is associated with information of an original signal; and, decoding said encoded bitstream to obtain decoded information which is used to reconstruct the original signal, wherein the first NAL unit is a type of NAL unit reserved or unspecified according to a base coding standard such that the first NAL unit would be ignored by a decoder according to the base coding standard, the encoded bitstream comprises an enhancement stream, the enhancement stream comprises two levels of enhancement, and decoding the encoded bitstream comprises:

decoding a first residual signal encoded within the encoded bitstream, the first residual signal relating to a first level of quality, decoding a second residual signal encoded within the encoded bitstream, the second residual signal relating to a second level of quality, wherein the first level of quality and the second level of quality comprise different spatial resolutions, combining the first residual signal with base decoded information from a decoded base stream, the base stream being coded according to the base coding standard, the decoded base stream being received within a second NAL unit, and combining the second residual signal with a signal derived from the combining of the first residual signal with base decoded information to output a reconstruction of the original signal.

2. The method of claim 1, wherein the first and second residual signal correspond to a frame of video and the method further comprises retrieving a reference index from the first NAL unit referencing a frame of the original signal as carried within the second NAL unit.

3. The method of claim 1, further comprising:

receiving the second NAL unit;

parsing the second NAL unit according to the base coding standard to obtain a base encoded bitstream which is associated with the base encoded information encoded using the base coding standard; and decoding said base encoded bitstream to obtain the base decoded information.

4. The method of claim 3, wherein the first and second NAL units are received in an Access Unit of an elementary stream according to a predefined format.

5. The method of claim 4, wherein the Access Unit represents a frame of the original signal and the original signal is a video.

6. The method of claim 4, wherein the NAL unit, predefined format and/or base coding standard are associated with AVC, HEVC, AV1, VP8, or VP9.

7. The method of claim 3, further comprising:

retrieving a plurality of first NAL units in a defined order;

retrieving a plurality of second NAL units in a defined order;

combining the base decoded information with the decoded information; and, re-ordering the combination to reconstruct a signal.

8. The method of claim 1, further comprising retrieving configuration metadata from the payload.

9. The method of claim 1, wherein the encoded bitstream is contained in a payload of the first NAL and wherein the method further comprises retrieving configuration data in a header of the first NAL unit.

10. The method of claim 1, further comprising: retrieving a plurality of NAL units organised into a group of pictures; retrieving first configuration metadata signalled for each group of pictures; and, retrieving second configuration metadata signalled with each NAL unit.

11. The method of claim 10, further comprising not retrieving configuration metadata for an initial NAL unit for each group of pictures where configuration metadata is sent for each group of pictures.

12. The method of claim 1, further comprising retrieving third configuration metadata signalled for each bitstream.

13. A decoding apparatus comprising a processor configured to:

receive a first Network Abstraction Layer, NAL, unit;

parse the first NAL unit to obtain an encoded bitstream, said encoded bitstream containing encoded information which is associated with information of an original signal; and, decode said encoded bitstream to obtain decoded information which is used to reconstruct the original signal, wherein the first NAL unit is a type of NAL unit reserved or unspecified according to a base coding standard such that the first NAL unit would be ignored by a decoder according to the base coding standard, the encoded bitstream comprises an enhancement stream, the enhancement stream comprises two levels of enhancement, and decoding the encoded bitstream comprises:

decoding a first residual signal encoded within the encoded bitstream, the first residual signal relating to a first level of quality, decoding a second residual signal encoded within the encoded bitstream, the second residual signal relating to a second level of quality, wherein the first level of quality and the second level of quality comprise different spatial resolutions, combining the first residual signal with base decoded information from a decoded base stream, the base stream being coded according to the base coding standard, the decoded base stream being received within a second NAL unit, and combining the second residual signal with a signal derived from the combining of the first residual signal with base decoded information to output a reconstruction of the original signal.

14. A non-transitory computer readable medium comprising instructions which when executed by a processor cause the processor to:

receive a first Network Abstraction Layer, NAL, unit;

parse the first NAL unit to obtain an encoded bitstream, said encoded bitstream containing encoded information which is associated with information of an original signal; and, decode said encoded bitstream to obtain decoded information which is used to reconstruct the original signal, wherein the first NAL unit is a type of NAL unit reserved or unspecified according to a base coding standard such that the first NAL unit would be ignored by a decoder according to the base coding standard, the encoded bitstream comprises an enhancement stream, the enhancement stream comprises two levels of enhancement, and decoding the encoded bitstream comprises:

decoding a first residual signal encoded within the encoded bitstream, the first residual signal relating to a first level of quality, decoding a second residual signal encoded within the encoded bitstream, the second residual signal relating to a second level of quality, wherein the first level of quality and the second level of quality comprise different spatial resolutions, combining the first residual signal with base decoded information from a decoded base stream, the base stream being coded according to the base coding standard, the decoded base stream being received within a second NAL unit, and combining the second residual signal with a signal derived from the combining of the first residual signal with base decoded information to output a reconstruction of the original signal.

* * * * *